United States Patent Office
3,657,359
Patented Apr. 18, 1972

3,657,359
DERIVATIVES OF PHLOROGLUCINOL
Madeleine Vaille, born Penciolelli, Brunoy, France, assignor to Societe Anonyme dite: Orsymonde, Paris, France
No Drawing. Filed Aug. 29, 1969, Ser. No. 854,264
Claims priority, application Great Britain, Sept. 4, 1968, 42,137/68
Int. Cl. C07c 43/22
U.S. Cl. 260—613 D
2 Claims

ABSTRACT OF THE DISCLOSURE

This invention is concerned with phloroglucinol derivatives which are represented by the formula:

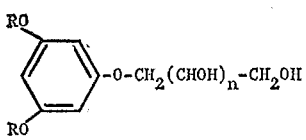

wherein R is a lower alkyl group and n is 0 or 1. These compounds having interesting pharmacological properties are obtained by reacting 3,5-dialkoxy-phenol with either glycol chlorhydrin or glycerol chlorhydrin.

---

The present invention concerns derivatives of phloroglucinol which are represented by the formula:

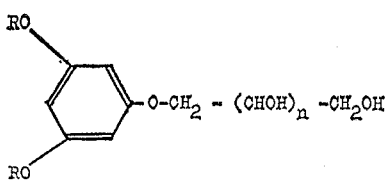

in which R is a lower alkyl group and n is 0 or 1.

The present invention also concerns pharmaceutical compositions comprising as the active principle at least one of the above-defined phloroglucinol derivatives.

These new compounds have interesting pharmacological properties and, in particular, they have an antispasmodic and hyperchloreretic activity and some have a certain transquilising action.

The compounds according to the invention are prepared by reacting 3,6-dialkoxy-phenol with either glycol chlorhydrin or glycerol chlorhydrin, in the presence of sodium alcoholate, according to the following reaction scheme:

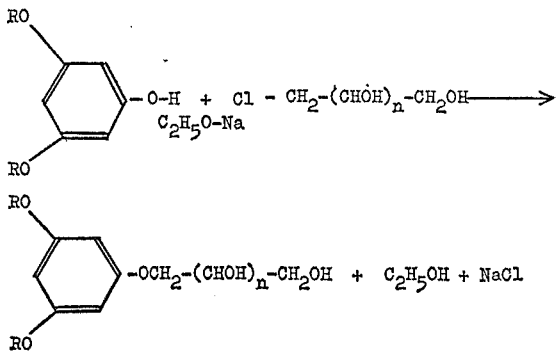

The following examples are intended to illustrate the invention:

EXAMPLE 1

(3,5-dimethoxy-phenoxy)-2-ethanol

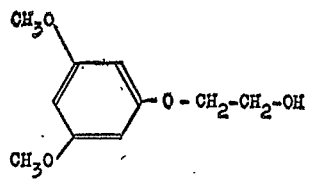

200 ccs. of absolute ethanol was added to a three-necked 1 litre flask provided with a reflux condenser, a CaCl$_2$ trap, a stirring device, a thermometer and a dropper. It was stirred and 9.2 g. of sodium was added in small amounts.

When all the sodium had been dissolved, a solution of 61.6 g. of 3,5-dimethoxy-phenyl in 200 ccs. absolute ethanol was slowly stirred in. The dropper was washed with 50 ccs. absolute ethanol.

32.2 g. of glycol chlorhydrin was slowly poured in and the dropper was washed with 50 ccs. of absolute ethanol. The reactor was left under reflux on a water bath for 3 hours (79° C.).

At the end of the required time, the reflux was stopped. The sodium chloride was left to settle for an hour, filtered off and washed with 2 × 50 ccs. of absolute ethanol. The alcohol was then evaporated.

The reaction mixture was taken up in 400 ccs. of CH$_2$Cl$_2$ and washed with 3 × 250 ccs. of normal caustic soda. It was then washed with 250 ccs. of water. The sodium extracts and the wash water were washed with 100 ccs. of CH$_2$Cl$_2$ which was added to the preceding 400 ccs. The solution in CH$_2$Cl$_2$ was dried over sodium sulphate and evaporated. 37.9 g. of brown oil was obtained.

It was recrystallised from a mixture of cyclohexane (250 ccs.) and absolute ethanol (25 ccs.).

It was dissolved at boiling point and cooled with vigorous agitation and seeded with crystals which had already been prepared.

It was placed in a refrigerator (5°–7° C.) for one night. It was then filtered off and dried under vacuum at 35° C. to constant weight. It was washed with 3 × 25 ccs. of the crystallisation mixture. White, slightly cream crystals were obtained.

Weight 32 g. Yield: 40.4%

Melting point: 57° C.

Only a single band was obtained by plate chromatography.

EXAMPLE 2

3-(3,5-dimethoxy-phenoxy)-propanediol-1,2

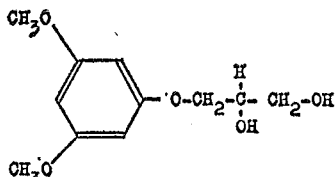

200 ccs. of absolute ethanol was added to a three-necked 1 litre flask equipped in the same way as in Example 1. 9.2 g. of sodium was added in small amounts.

When all the sodium had been dissolved, a solution of 61.6 g. of 3,5-dimethoxy-phenol in 200 ccs. of absolute ethanol was slowly poured in. The dropper was washed with 50 ccs. of absolute ethanol.

44.2 g. of glycerol chlorhydrin was then poured in and the dropper washed with 50 ccs. of absolute ethanol.

The mixture was left under reflux on a water-bath for 3 hours (temperature: 79° C.).

At the end of this time, reflux was stopped. The NaCl was left to settle for an hour, then filtered off on $F_4$ and the filter was washed with 2× 50 ccs. of absolute ethanol.

The alcohol was evaporated and the residue taken up in 400 ccs. of $CH_2Cl_2$.

The solution obtained was washed with 3× 250 ccs. of normal caustic soda (as the emulsion was always difficult to break down, it was centrifuged) and then washed with 100 ccs. of water and allowed to settle overnight.

The sodium extracts and the aqueous wash liquid were washed with 100 ccs. of $CH_2Cl_2$ which was combined with the preceding 400 ccs. The solution in $CH_2Cl_2$ was dried over sodium sulphate and evaporated.

The residue was taken up in 200 ccs. of benzene at boiling point. A clear solution was obtained which was cooled with stirring.

Crystallisation was started by a few seed crystals prepared in advance and left to crystallize for one night at about 10° C.

The mixture was filtered and the crystals obtained were washed with 3× 20 ccs. of $C_6H_6$, wiped and dried under vacuum at 35° C. until constant weight. Yellow crystals were obtained. Weight 61.5 g.: yield 67.5%; melting point: 73° C. Only a single band was obtained by plate chromatography.

EXAMPLE 3

3-(3,5-diethoxy-phenoxy)-propanediol-1,2

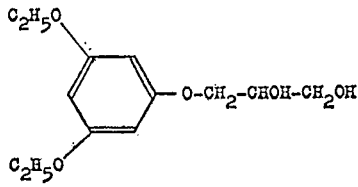

50 ccs. of absolute ethanol was poured into a 250 ccs. three-necked flask equipped in the same way as in Example 1.

1.52 g. of sodium was slowly added and stirred until dissolved. A solution of 12 g. of 3,5-diethoxyphenol in 50 ccs. of absolute ethanol was then added.

8 g. of glycerol chlorohydrin was then added drop by drop over about 5 minutes.

The dropper was washed with 20 ccs. of absolute ethanol and brought to reflux on a water-bath.

At the end of 7 hours, reflux was stopped and it was allowed to settle for one night. The NaCl was removed by filtration and washed with 3× 15 ccs. of absolute ethanol.

The alcohol was evaporated on a "Rotavapor" and the residue taken up in 200 ccs. of methyl dichloride and washed with 4× 50 ccs. of normal caustic soda, then with 3× 100 ccs. of water.

The alkaline extracts and water washings were washed with 100 ccs. of $CH_2Cl_2$ which was combined with the preceding 200 ccs. of $CH_2Cl_2$.

It was dried over sodium sulphate, filtered and evaporated. 8.85 g. of a yellow oil was obtained which was then dissolved in 50 ccs. of a mixture of ethanol (10 ccs.) and water (40 ccs.).

This was brought to boiling point and cooled in ice with agitation. When crystallisation had begun, the mixture was placed in a refrigerator for one night.

It was then filtered, washed with 2× 10 ccs. of iced water and dried under vacuum over $P_2O_5$. A fine powder with yellow reflections was obtained. Melting point: 71° C.; weight: 6.3 g.; yield: 37.3%.

Plate chromatography only gave one band.

PHARMACOLOGICAL STUDY (1) Acute toxicity in mice

The compounds according to the invention, with a concentration corresponding to the maximum solubility, were administered intravenously to mice. 1 death in 12 animals was observed with a dose of 400 mg./kg. of the compound of Example 1, and of 600 mg./kg. of the compound of Example 2. By buccal administration, the $DL_{50}$ of compositions 1 and 2 respectively are 2 g./kg. and 2.1 g./kg. For the compound of Example 3, there was no mortality with a dose of 200 mg./kg. I.V.

For the compounds of Examples 1 and 3, a loss of the turning reflex was seen and for that of Example 2, a very rapid hypnotic effect of variable duration.

The compound of Example 2, administered intraperitoneally in aqueous suspension in "Tween 80" (sorbitol mono-oleate condensed with 20 molecules of ethylene oxide), did not exert any toxic effect at 500 mg./kg. and caused the death of 3/12 of the animals with a dose of 1 g./kg.

Administered gastrically, the compound of Example 3 did not exert any toxic effect up to a dose of 1 g./kg. A strong sedation was observed with a dose of 500 mg./kg.

(2) Antispasmodic and choleretic actions (a) Antispasmodic action in vitro: This action was studied on isolated rat duodenum and on isolated guinea-pig urether, for the compounds of Examples 2 and 3.

On isolated rat duodenum: The compound of Example 2, at a dose of 600 mcg./ml., clearly lowered the tone of the organs at rest, though this tone was not altered by 250 mcg./ml. of the compound of Example 3.

The compound of Example 2, in a dose of 600 mcg./ml., exerted a 100% decontracting effect on the organs contracted by barium chloride; the DE–50 was 55 mcg./ml.; the compound of Example 3, in a dose of 1 mg./ml., exerted an 80% decontracting effect.

The compound of Example 2 exerted an antagonistic effect on the organs contracted by acetylcholine, the DE–50 being about 80 mcg./ml.; the compound of Example 3, in a dose of 80 mcg./ml. reduced the contracting effect of acetylcholine by 23% and in a dose of 250 mcg./ml. by 74%.

On isolated guinea-pig urether: On 9 organs subjected to the action of barium chloride, the compound of Example 2, in a dose of 600 mcg./ml., stopped the antispasmodic action but was inactive in a dose of 250 mcg./ml.

The compound of Example 3 preventively and curatively lessened the action of the barium chloride in a dose of 80 mcg./ml., suppressing the spontaneous contractions once every 5 times in a dose of 250 mcg./ml.; it curatively stopped the action of barium 2 out of 4 times, in a dose of 500 mcg./ml.

(b) Antispasmodic action in vivo on guinea-pig ileus: The product according to the invention was intravenously injected in solution in physiological serum. The compound of Example 1, in a dose of 25 mg./kg. stopped peristalsis for 5 minutes and 58% hypotension was observed. In a dose of 50 mg./kg., it immediately stopped peristalsis for 10 minutes and the hypotensive effect, about 60%, was fleeting and did not seem to be the cause of the antispasmodic effect.

The compound of Example 2, in a dose of 24 mg./kg., produced a clear drop in peristalsis for 10 to 30 minutes and in a dose of 60 mg./kg., it stopped peristalsis for 10 to 12 mins., the injection causing 30% hypotension.

The compound of Example 3, stopped peristalsis with 10 mg./kg. and the antispasmodic effect at the peak of the action was 50%. The duration of the effect was from 5 to 10 mins., no action on the arterial pressure being observed. In a dose of 20 mg./kg., the antispasmodic index at the peak of the action was 60% and the duration of the effect was about 5 to 20 mins. No action on the arterial pressure was observed.

(c) Antispasmodic and choleretic action in vivo in anaesthetized dogs: Intestinal peristalsis, excess pressures on Oddi's sphincter and biliary output were observed in 6 dogs subjected to the action of morphine and prostigmine and which had been intravenously injected with 50 mg./kg. of the compound of Example 1.

Action on duodenal peristalsis.—In three experiments, the tone and amplitude and frequency of peristalsis had been reduced. In three other experiments, peristalsis had been stopped and this effect was prolonged, according to the experiments, from 10 to 35 mins.

Action of the excess pressures on Oddi's sphincter.—Excess pressures on Oddi's sphincter caused by perfusion of physiological serum at the 3 usual rates (2, 5 and 10 ml.) had been reduced in all three experiments:

from 34 to 93% at the perfusion rate of 2 ml.;
from 38 to 80% at the perfusion rate of 5 ml.;
from 44 to more than 77% at the perfusion rate of 10 ml.

This effect lasted from 10 to 40 mins., according to conditions, but at an average for about 20 mins.

Action on the choledoch discharge.—In 6 experiments, the compound of Example 1 exterted an intense, prolonged hypercholeretic effect lasting more than 1 hour. As an average, the maximum hypercholeresis was 375%.

(d) Choleretic action in anaesthetized rats: The experiments were carried out on two series of 5 anaesthetized rats, with the compounds of Examples 2 and 3.

In a dose of 60 mg./kg. injected intravenously, the compound of Example 2, produced hypercholeresis for 75 to 105 mins.

In a dose of 20 mg./kg. injected intravenously, the compound of Example 3 raised the choleresis to the maximum of 60%, an effect which was prolonged for more than 90 mins.

(3) Cardiovascular properties studied on isolated rabbit heart

On 5 hearts perfused by Van Dyke Hastings solution containing barium chloride, the compound of Example 2, in a dose of 10 mcg./ml. (experiment on three hearts):

did not alter the coronary output;
exerted a weak, variable inotropic effect;
did not alter the rhythm;

in a dose of 100 mcg./ml. (experiment on 2 hearts):

increased the coronary output (+22%; +40%)
exerted a negative inotropic effect (−40%; −29%)
did not alter the rhythm;

(4) Action on the central nervous system

The product of Example 3 is a tranquillizer when administered intramuscularly at a dose of 200 mg./kg. It significantly increases the length of the barbituric sedation which passes from 28 minutes in control to 121 minutes in treated animals. This effect is comparable to that of the same dose of meprobamate.

The product of Example 2 at a dose of 150 mg./kg. administered intramuscularly is a depressant of the central nervous system and speeds up the spontaneous diminution of the motility and increases the barbituric sedation.

In return, the product of Example 1 at a dose of 100 mg./kg. administered intramuscularly has little action on the central nervous system. However, stronger doses show sedation, increase in experimental sedation and itself brings on sedation.

CONCLUSIONS OF THE PHARMACOLOGICAL STUDY

The compound of Example 1 exerted an intestinal antispasmodic effect in guinea-pigs and dogs and also upon Oddi's sphincter in dogs; but it did not exert any antispasmodic effect on the urether. It had an intense, prolonged hypercholeretic effect in dogs.

The compound of Example 2 exerted antispasmodic effects in vitro on rat duodenum (the $DE_{50}$ was 55 mcg./ml. in relation to barium chloride and 85 mcg./ml. in relation to acetylcholine) and on the urether where it stopped the action of barium chloride in a dose of 600 mcg./ml.

It had an average but lasting hypercholeretic action in a dose of 60 mg./kg. intravenously injected in rats.

The compound of Example 3 was not toxic at an intravenous dose of 200 mg./kg. and oral dose of 1 g./kg., but it possessed hypnotic properties. It exerted an antispasmodic effect in vitro relative to barium chloride and acetylcholine and in vivo at doses of 10 and 20 mg./kg., the effect being proportional to the dose. It has an average hypercholeretic effect, but of quite long duration, in anaesthetized rats.

Clinical study has given the following results: The compound of Example 1 administered buccally to humans at doses of 0.10 g., 0.20 g. and 0.30 g. by tablet, capsule or pill at 3 to 5 doses a day has excellent results in the treatment of intestinal spasms. By injection, the same results are obtained with ampoules of 100 mg. in 9% sodium chloride solution.

Therapeutically, the compound of Example 2 has been used successfully in the treatment of intestinal and biliary illnesses, colitis and disorders of the biliary vessels in tablet or injectable ampoule form. The ampoules contained 50 mg. of the active compound dissolved in 9% sodium chloride solution. The tablets, capsules or pills contained 150 mg. to 300 mg. per dose.

The compound of Example 3 gave excellent results in the treatment of disorders in the biliary vessels. In addition to the antispasmodic action, it had a tranquillising action.

I claim:

1. A compound of the formula:

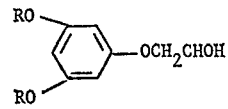

wherein R is lower alkyl.

2. The compound according to claim 1 which is (3,5-dimethoxy-phenoxy)-2-ethanol.

References Cited

Meltzer et al.,: JACS, vol. 72 (1950), pp. 4986–4988.
Bliznyuk et al.: Chem. Abs., vol. 65 (1966), 638.

BERNARD HELFIN, Primary Examiner

U.S. Cl. X.R.

424—341